United States Patent [19]

Tamura

[11] Patent Number: 5,118,157

[45] Date of Patent: Jun. 2, 1992

[54] APPARATUS FOR PREVENTING WATER DROPLETS FROM ATTACHING TO A VEHICLE SIDE WINDOW

[75] Inventor: Tatsuya Tamura, Yokohama, Japan

[73] Assignee: Hashimoto Forming Industry Co., Ltd., Japan

[21] Appl. No.: 558,453

[22] Filed: Jul. 27, 1990

[30] Foreign Application Priority Data

Jul. 31, 1989 [JP] Japan ................. 1-198722

[51] Int. Cl.⁵ ............................................. B60R 13/06
[52] U.S. Cl. ................... 296/93; 296/180.5; 49/476; 49/477; 52/400
[58] Field of Search .......... 296/93, 208, 180.1, 296/180.5, 154, 212; 49/476, 477; 98/2.12; 52/400

[56] References Cited

U.S. PATENT DOCUMENTS 3,583,757 6/1971 Wilfert et al. .............. 296/154 X

FOREIGN PATENT DOCUMENTS

| | | | |
|---|---|---|---|
| 2211896 | 9/1973 | Fed. Rep. of Germany | 49/477 |
| 2335957 | 1/1975 | Fed. Rep. of Germany | 49/476 |
| 3119358 | 12/1982 | Fed. Rep. of Germany | |
| 3121093 | 12/1982 | Fed. Rep. of Germany | 296/208 |
| 3718121 | 12/1988 | Fed. Rep. of Germany | 296/208 |
| 0060143 | 4/1985 | Japan | 296/93 |
| 62-178422 | 8/1987 | Japan | |
| 62-178454 | 8/1987 | Japan | |

OTHER PUBLICATIONS

Translation of 2211896 (German).

*Primary Examiner*—Dennis H. Pedder
*Attorney, Agent, or Firm*—Stevens, Davis, Miller & Mosher

[57] ABSTRACT

Apparatus for preventing water droplets from attaching onto a vehicle side window includes a window molding member along a body panel adjacent to a windshield plate and the side window, to cover a clearance between the windshield plate and the body panel. The molding member has a rear end portion near the side window, which is provided with a flap actuated by an actuator on the rear side of the flap. The flap is movable between a closed position for non-rainy condition and an open position for rainy condition in which the flap opens toward the rear side of the vehicle.

5 Claims, 2 Drawing Sheets

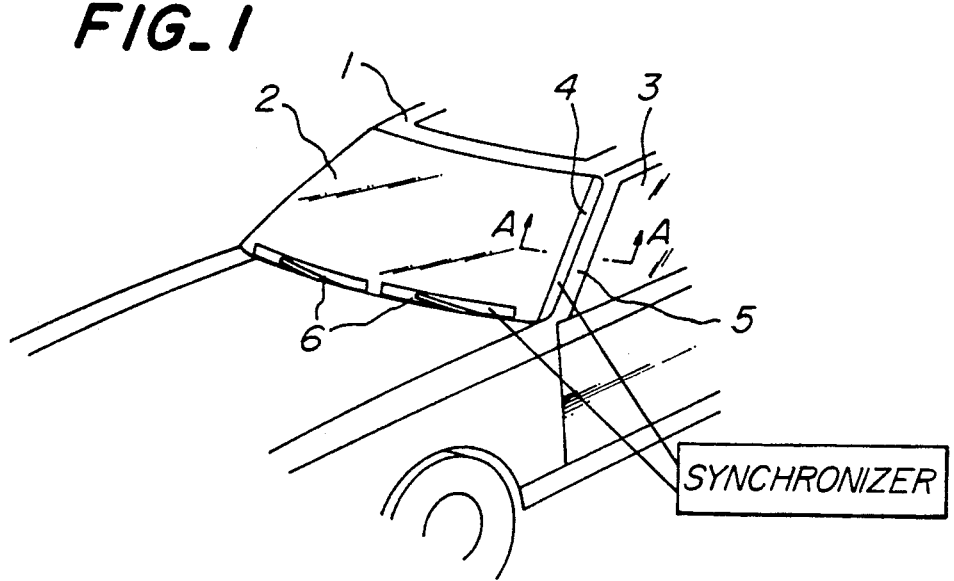
FIG_1
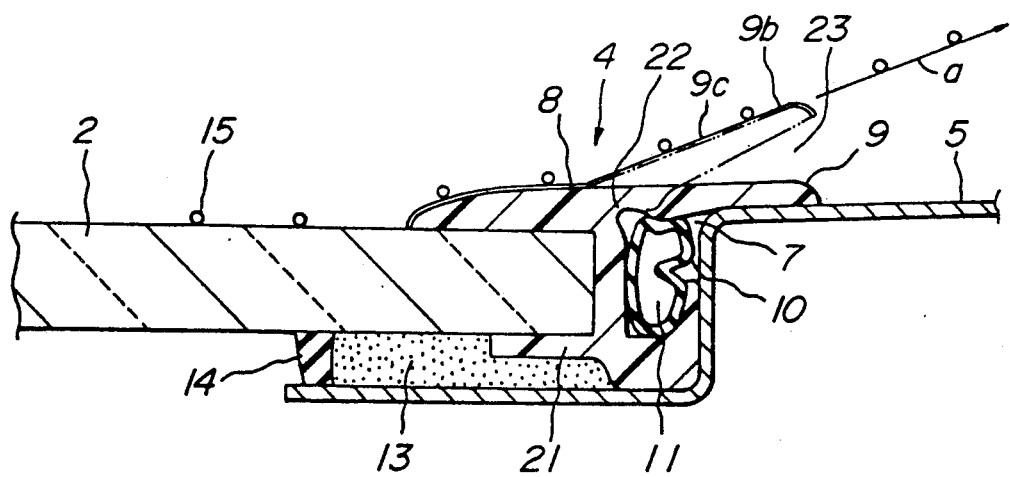
FIG_2

APPARATUS FOR PREVENTING WATER DROPLETS FROM ATTACHING TO A VEHICLE SIDE WINDOW

BACKGROUND OF THE INVENTION

1. Field of the Invention

The present invention relates to an apparatus for preventing water droplets from attaching to a vehicle side window adjacent to a windshield plate, particularly during the running of the vehicle in rainy weather.

2. Description of the Related Art

An apparatus for preventing water droplets from attaching to a vehicle side window is disclosed, e.g. in Japanese Patent Application Laid-open Publication Nos. 62-178,422, 62-178,454 as well as 57-194,162 which corresponds to German Offenlegungsschrift No. 3 119 358. Here, the apparatus includes a window molding member having a molding main body portion which is mounted on the vehicle body so as to cover a clearance between a side portion of the windshield plate and a vehicle body panel. The main body portion is formed with a flap protruding in the forward direction of the vehicle, i.e. toward the windshield plate. The flap is so arranged that it can be lifted into an open position or lowered into a closed position, either by introducing an appropriate fluid, such as compressed air, working oil or the like, into a hollow cavity of a tubular actuator arranged on the rear surface side of the molding body, or by discharging the fluid from the cavity of the actuator. The flap in its open position forms a groove-like water guide portion during rainy conditions, and is maintained during its closed position in non-rainy conditions.

In the above-mentioned arrangement of the known apparatus, the fluid is introduced during rainy conditions into the hollow cavity of the actuator to lift the flap into the open position to thereby form the groove-shaped water guide portion. Then, the water droplets on the windshield plate are collected into the water guide portion to flow down along the flap, and are effectively prevented from flowing across and beyond the neighboring vehicle body panel. It is thus possible to prevent the droplets from attaching onto the side window and provide undisturbed driver's visual field therethrough.

However, in such a conventional apparatus, since the flap in its open position is directed forwardly of the vehicle, it tends to capture various kinds of solid foreign matters thereby potentially causing physical dangers to pedestrians or motorcyclist. Moreover, in snowfall condition, snow tends to become accumulated in the water guide portion and forms a substantial obstacle to the proper operation of the wiper.

SUMMARY OF THE INVENTION

It is therefore an object of the present invention to provide an improved apparatus which prevents water droplets from attaching to a vehicle side window, and which is substantially free from the above-mentioned problems of the conventional arrangement.

According to the present invention, there is provided an apparatus for preventing water droplets from attaching onto a vehicle side window, comprising: a window molding member arranged along a body panel adjacent to a windshield plate and the side window, so as to cover a clearance between the windshield plate and the body panel; said molding member having a rear end portion disposed remote from said windshield plate and near said side window, said end portion being formed with a flap which is movable between a closed position and an open position in which the flap opens toward said side window; and an actuator arranged on a rear side of said flap for moving the flap from one position to another.

In the apparatus according to the present invention, the actuator is operated to drive the flap into either the open or closed position. Thus, during rainy conditions, the flap is maintained in its open position so that the free end of the flap is spaced from the vehicle panel on the rear side to form a guide portion for splashing the rain water droplets away from the vehicle body, in the rearward direction of the vehicle. It is thus possible to effectively prevent or at least suppress water droplets from attaching onto the side window, and to thereby preserve the driver's undisturbed visual field through the side window.

The novel arrangement according to the present invention, wherein the flap opens toward the rear side of the vehicle, is particularly advantageous in the following points. First, the flap does not exhibit a marked tendency to capture solid matter or to potentially cause physical dangers to pedestrians or motorcyclists. Second, even in its open position, the flap is free from accumulation of snow. It is of course that, except for rainy or snowfall conditions, the flap is maintained in its closed position, thus making it possible to eliminate the problems of potential physical dangers or accumulation of snow.

There are many possibilities in the manner of carrying out the present invention. For example, the flap may be preferably formed as an integral part of the window molding member, although they may be separate from each other. Also, particularly when the flap is an integral part of the window molding member which itself is flexible, the flap may be preferably composed of an elastomeric synthetic resin material or rubber, although it may be composed of a relatively rigid material, such as metal or the like, particularly when the molding member is not bent in its longitudinal direction. Furthermore, the window molding member may be formed either as an integral part (often called a "gasket" or "packing") of the windshield plate, which is arranged along the peripheral edge portion thereof, or as a component which is separate from the windshield plate.

The actuator may also be either integral with or separate from the window molding, and is not restricted to particular arrangement, material, mechanism for actuating flap, etc. According to one preferred embodiment of the present invention, the actuator comprises a flexible tube which can be expanded by charging a fluid into the tube to open the flap from its closed position. Alternatively, the actuator may comprise a flexible tube which can be shrunk by discharging a fluid from the tube to close the flap from its open position.

According to another embodiment of the present invention, the actuator is adapted to actuate the flap synchronously with the actuation of a wiper which is provided in association with the windshield plate, and usually operated in rainy or snowfall conditions.

According to still another embodiment of the present invention, the flap is formed with a water-repellent layer on its outer surface. By this, the water droplets are repelled by the repellent layer with the result that a substantial amount of the droplets are splashed outwardly of the vehicle effectively.

BRIEF DESCRIPTION OF THE DRAWINGS

FIG. 1 is a fragmentary perspective view of a vehicle to which the the apparatus according to the invention may be applied; and FIGS. 2 to 4 are respectively cross-sectional views showing various embodiments of the invention, and taken along the line A—A in FIG. 1.

DETAILED DESCRIPTION OF THE PREFERRED EMBODIMENTS

Figure 3:
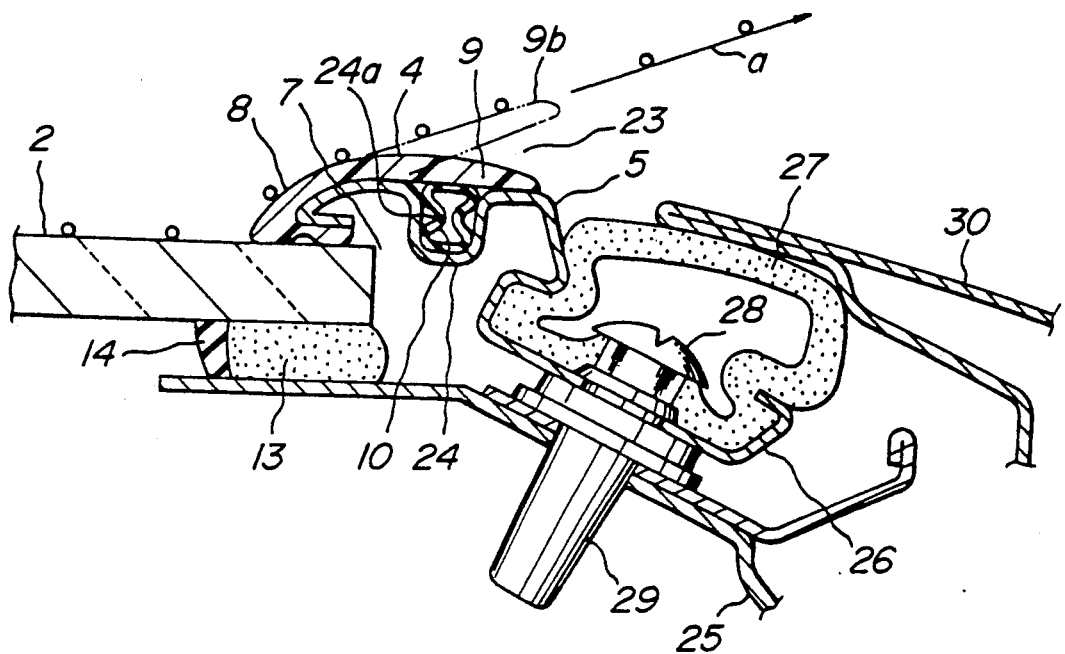

The present invention will be explained in further detail with specific reference to some preferred embodiments shown in the accompanying drawings.

To begin with, there is shown in FIG. 1 a vehicle to which the present invention may be applied, and which includes a vehicle body 1, a windshield plate 2, side windows 3, a window molding member 4. The vehicle body 1 includes a body panel or pillar 5 adjacent to the windshield plate 2 and a side window 3 on each side of the vehicle.

A first embodiment of the invention is shown in FIG. 2, wherein the window molding member 4 is attached to the vehicle body 1 so as to cover a clearance 7 left between the windshield plate 2 and the body panel 5. The window molding member 4 includes a main body portion 8 and an anchorage portion 21, which are in engagement with the peripheral edge of the windshield plate 2 in order to maintain the molding member 4 in place. Preferably, the window molding member 4 is composed of a resiliently deformable, plasticized synthetic resin material. A flap 9 extends from the main body portion 8 of the molding member 4 toward the body panel 5 via a hinge connection 22 in the form of a thin-walled portion, so that the free end portion of the flap 9 is movable between a closed position and an open position shown by the solid line and the imaginary line in FIG. 2, respectively. The flap 9 in its open position functions as a guide 9b which forms an open area 23 between the flap 9 and the body panel 5. An actuator 10, which comprises a flexible tube of a resilient material such as rubber, plasticized resin or the like, is accommodated within the clearance 7 so that a fluid (preferably compressed air or hydraulic oil) can be charged into or discharged out of a cavity 11 of the tube synchronously with the operation of a wiper 6 which is provided in association with the windshield plate 2. A water-repellent layer 9c is formed on the outer surfaces of the flap 9 and the main body portion 8 of the molding member 4.

The above-mentioned apparatus is designed such that, when the wiper 6 on the windshield plate 2 is operated in rainy or snowfall conditions, the actuator 10 is caused to expand synchronously with the operation of the wiper by introducing a fluid into the cavity 11 of the tube to force the flap 9 into its open position and form the guide 9b. By this, the clearance 23 is formed between the flap 9 and the vehicle body panel 5.

Then, water droplets 15 on the windshield plate 2 are collected by the wiper blade, and directed to flow across the guide 9b and splashed in the direction away from the vehicle body as indicated by arrow a. As a result, the water droplets 15 are prevented from attaching onto the side window 3, making it possible to preserve the driver's uninterrupted visual field through the side window 3.

In this connection, since the flap 9 opens in the rearward direction of the vehicle, it does not tend to capture solid matter, to cause potential physical dangers to the pedestrians or motorcyclists, or to accumulate snow during snowfall conditions. Moreover, the formation of the water-repellent layer 9c on the outer surface of the flap 9 results in that the rain water droplets are guided to flow across and over the flap 9 at a faster speed, without adhering thereto. It is thus readily possible to splash much of the the droplets effectively toward the outer side of the vehicle, thereby reducing the amount of droplets splashed toward the side window 3.

When the operation of the wiper 6 is stopped during non-rainy conditions, supply of the fluid to the actuator 10 is stopped and the fluid is discharged from the flexible tube so that the flap 9 is moved back to its closed position by the resilient restoring force of the flap 9 itself.

In a second embodiment of the present invention shown in FIG. 3, the window molding member 4 is attached to a retainer 24 projecting from the vehicle body panel 5 in the form of a pillar. The actuator 10 comprises a flexible tube which is accommodated in a recess 24a defined by the retainer 24. There is further shown in FIG. 3 a pillar panel 25 to which the pillar 5 is secured. More particularly, the pillar 5 has a retainer 26 for retaining a weather strip 27, which retainer is secured by a screw 28 to a grommet 29 fixedly secured to the pillar panel 25 in advance. Incidentally, reference numeral 30 denotes a door panel. Also in this embodiment, as in the previous one, the flap 9 is movable between an open position and a closed position by operating the actuator 10.

Figure 4:
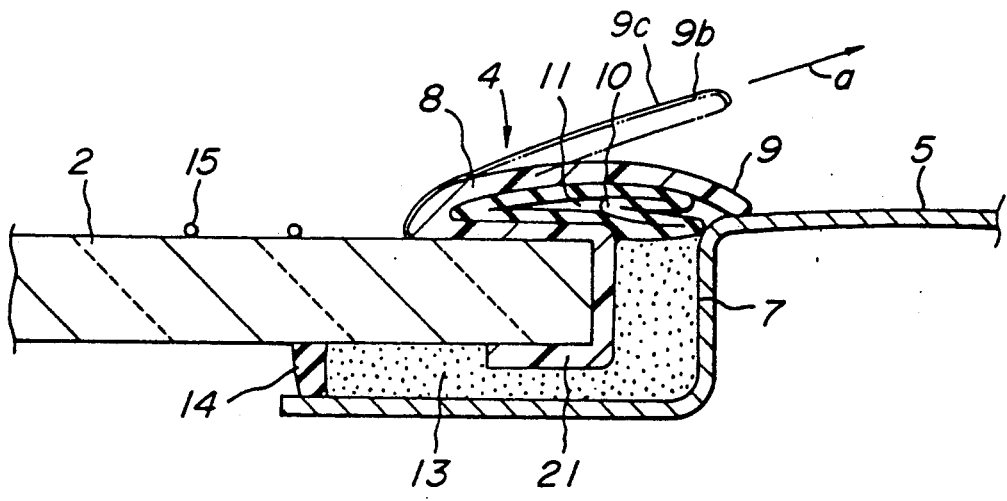

In a third embodiment shown in FIG. 4, the arrangement is substantially the same as that shown in FIG. 2, except that the actuator 10 is arranged on the rear side of the flap 9. Also in this embodiment, as in the previous ones, the flap 9 is movable between an open position and a closed position by operating the actuator 10 which is located on the inner side of flap 9 and partly inside of the main body portion of main body 8.

While the present invention has been described with reference to certain preferred embodiments, various modifications are possible without departing from the scope of the invention. For example, the shape, arrangement, material, mounting position and the like of the molding member 4, flap 9 and actuator 10 are not restricted to those of the above-described embodiments. Thus, when the flap 9 of the molding member 4 extends rectilinearly in the longitudinal direction, it is possible to incorporate a mechanical rotary drive means as the actuator 10. In addition, the actuator 10 may be of a construction which is opened in rainy conditions and closed by applying a negative pressure in non-rainy conditions, or it may comprise a tubular actuator formed integrally with the flap 9.

What is claimed is:

1. An apparatus for preventing water droplets from attaching onto a vehicle side window, comprising:
   a window molding member arranged along a body panel adjacent to a windshield plate so as to cover a clearance along the side edge of the windshield plate;
   said molding member having a rear end portion formed with a flap having an outer surface, an inner surface and a rearwardly pointing free end, said flap being movable between a closed position and an open position in which the free end of the flap is lifted in a direction away from said clearance along the side edge of the windshield plate; and an actuator arranged on the inner surface of said flap for moving the flap from one of said positions to the other of said positions;

said outer surface being substantially smooth such that in both the closed position and open position of said flap, water droplets moving from said windshield plate toward said side window will pass over the outer surface of the molding member substantially unhindered by said flap when in either of said positions.

2. The apparatus as set forth in claim 1, wherein said actuator is adapted to actuate said flap synchronously with actuation of a wiper associated with said windshield plate.

3. The apparatus as set forth in claim 1, wherein said flap is formed with a water-repellent layer on its outer surface.

4. An apparatus for preventing water droplets from attaching onto a vehicle side window, comprising:

a window molding member arranged along a body panel adjacent to a windshield plate so as to cover a clearance along the side edge of the windshield plate;

said molding member having a rear end portion formed with a flap having a rearwardly pointing free end which is movable between a closed position and an open position, said flap having an outer surface and an inner surface, said inner surface covering said clearance when the flap is in the closed position; and an actuator arranged on said inner surface of said flap for moving the flap from one of said positions to the other of said positions, wherein said actuator comprises a flexible tube which can be expanded by charging a fluid into the tube to open said flap from said closed position;

said outer surface being substantially smooth such that in both the closed position and open position of said flap, water droplets moving from said windshield plate toward said side window will pass over the outer surface of the molding member substantially unhindered by said flap when in either of said positions.

5. An apparatus for preventing water droplets from attaching onto a vehicle side window, comprising:

a window molding member arranged along a body panel adjacent to a windshield plate so as to cover a clearance along the side edge of the windshield plate;

said molding member having a rear end portion formed with a flap which is movable between a closed position and an open position, said flap having an outer surface and an inner surface, said inner surface covering said clearance when the flap is closed; and an actuator arranged on said inner surface of said flap for moving the flap from one of said positions to the other of said positions, wherein said actuator comprises a flexible tube which can be shrunk by discharging a fluid from the tube to close said flap from said open position;

said outer surface being substantially smooth such that in both the closed position and open position of said flap, water droplets moving from said windshield plate toward said side window will pass over the outer surface of the molding member substantially unhindered by said flap when in either of said positions.

* * * * *